US007395452B2

(12) United States Patent
Nicholson et al.

(10) Patent No.: US 7,395,452 B2
(45) Date of Patent: Jul. 1, 2008

(54) METHOD AND SYSTEM FOR IMPROVED RELIABILITY IN STORAGE DEVICES

(75) Inventors: Clark D. Nicholson, Seattle, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 10/949,154

(22) Filed: Sep. 24, 2004

(65) Prior Publication Data
US 2006/0069870 A1 Mar. 30, 2006

(51) Int. Cl.
G06F 11/00 (2006.01)
(52) U.S. Cl. .................... 714/22; 714/6; 714/14
(58) Field of Classification Search .......... 714/14, 714/22
See application file for complete search history.

(56) References Cited

U.S. PATENT DOCUMENTS

| | | | | |
|---|---|---|---|---|
| 5,269,019 A * | 12/1993 | Peterson et al. | .............. | 707/205 |
| 5,437,040 A * | 7/1995 | Campbell et al. | ........... | 713/340 |
| 5,586,291 A * | 12/1996 | Lasker et al. | ................ | 711/113 |
| 5,708,820 A * | 1/1998 | Park et al. | .................... | 713/323 |
| 6,295,577 B1 * | 9/2001 | Anderson et al. | ........... | 711/113 |
| 7,055,056 B2 * | 5/2006 | Bessire | ........................... | 714/6 |
| 2002/0191471 A1 * | 12/2002 | Caulkins | ..................... | 365/226 |
| 2003/0142561 A1 * | 7/2003 | Mason et al. | ................ | 365/200 |
| 2004/0039960 A1 * | 2/2004 | Kassayan | ...................... | 714/14 |
| 2005/0120251 A1 * | 6/2005 | Fukumori | .................... | 713/300 |
| 2007/0006021 A1 * | 1/2007 | Nicholson et al. | .............. | 714/6 |

OTHER PUBLICATIONS

Chen, P.M. et al., "The Rio File Cache: Surviving Operating System Crashes", *Architectural Support for Programming Languages and Operating Systems, Proceedings of the 7th International Conference on Architectural Support for Programming Languages and Operating Systems*, 1996, 74-83.

Hu, Y. et al., "*DCD*-Disk Caching Disk: A New Approach for Boosting I/O Performance", *International Conference on Computer Architecture, Proceedings of the 23rd Annual International Symposium on Computer Architecture*, 1996, 169-178.

(Continued)

*Primary Examiner*—Emerson C Puente
(74) *Attorney, Agent, or Firm*—Woodcock Washburn LLP (57) ABSTRACT

A method of preventing data loss in a data storage system includes supplying write data to a high speed volatile write buffer and supplying electrical power from an energy storage device upon detection of a primary power loss event. The backup electrical power is supplied to the write buffer and nonvolatile cache. Under backup power, the write data is transferred into the nonvolatile cache and the backup power is removed. Upon regaining main power, a data presence indication triggers a transfer of the write data from the nonvolatile cache to the long term storage media. The method may be implemented for a system to protect it from inadvertent power losses or it may implemented in a system where the long term storage device is power cycled to save power. The energy storage device is not necessarily needed in the power cycled system unless power failure protection is also desired.

23 Claims, 4 Drawing Sheets

OTHER PUBLICATIONS

Schlosser, S.W. et al., "Designing Computer Systems with MEMS-Based Storage", *Architectural Support for Programming Languages and Operating Systems, Proceedings of the 9th International Conference on Architectural Support for Programming Languages and Operating Systems*, 2000, 1-12.

Varma, A. et al., "Destage Algorithms for Disk Arrays with Non-Volatile Caches", International Conference on Computer Architecture, *Proceedings of the 22nd Annual International Symposium on Computer Architecture*, 1995, 83-95.

Zhu, Y. et al., "Can Large Disk Built-in Caches Really Improve System Performance?", *Joint International Conference on Measurement and Modeling of Computer Systems, Proceedings of the 2002 ACM Sigmetrics International Conference on Measurement and Modeling of Computer Systems*, 2002, 284-285.

Zhu, Q. et al., "PB-LRU: A Self-Tuning Power Aware Storage Cache Replacement Algorithm for Conserving Disk Energy", *International Conference on Supercomputing, Proceedings of the 18th Annual International Conference on Supercomputing*, 2004, 79-88.

* cited by examiner

METHOD AND SYSTEM FOR IMPROVED RELIABILITY IN STORAGE DEVICES

CROSS REFERENCE TO RELATED PATENT APPLICATIONS

The following references have subject matter in common with the current application:

Co-Pending patent application Ser. No. 10/837,986 filed May 3, 2004 entitled "Non-Volatile Memory Cache Performance Improvement" commonly assigned with the present application; and U.S. Pat. No. 7,036,040 filed Nov. 26, 2002 entitled "Improved Reliability Of Diskless Network-Bootable Computers Using Non-Volatile Memory Cache" commonly assigned with the present application.

FIELD OF THE INVENTION

This invention relates in general to the field of data protection in computer systems. More particularly, this invention relates to a technique to preserve data being written to a long term storage device upon the loss of primary power.

BACKGROUND OF THE INVENTION

Large capacity storage devices, such as the mechanical disk drive, are one of the slowest and most unreliable components in modern computer systems largely due to their mechanical nature. These devices provide high capacity, long-term data storage at a very low cost but typically have long time delays during write operations because of the time it takes to move mechanical parts such as the record heads across the spinning magnetic media. These delays are observed when data is being written to random locations on the media requiring the heads to move frequently. These delays become evident to a computer user when performing operations such as saving files to a disk and give the impression that the computer is slow and unresponsive.

Storage device designers have generally employed write buffers made from fast, volatile, solid state memory to try to minimize the effects of the delays. This technique attains faster write performance but at the expense of the reliability of the data. Data is lost if power to the storage unit fails while there is data in the volatile write buffer that has not been transferred to the long-term non-volatile media. Data lost during a power interruption to a disk can be temporary or permanent but generally it is always distressing to a system user as the loss can waste time and have adverse economic impacts on business.

Thus, there is a need for a technique to eliminate data loss when power to at least a disk drive is lost. In addition, it would also be useful for the technique to be useful in systems which use power cycling as an intentional method of saving power in a computer system. The present invention addresses the aforementioned needs and solves them with additional advantages as expressed herein.

SUMMARY OF THE INVENTION

An embodiment of the invention includes a method to recover data that was transmitted by a computer system but not yet stored in a long term storage device when a power interruption to at least the storage device is lost. A write buffer is used to accept data from a data source, such as a computer, and forward that data onto a long term storage device such as a disk drive. When a power interruption occurs, one embodiment uses the charge from an energy storage device, such as a battery or capacitor, to provide backup power to both the write buffer and a nonvolatile cache. The backup power also allows a logic controller, such as a state machine, to transfer write data from the write buffer to the nonvolatile cache before backup power is exhausted. This action preserves the write data between the time when main power begins to fail and when backup power is removed or dissipates. After the main power is re-established, the preserved data in the nonvolatile cache is transferred to the long term storage device.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 1:
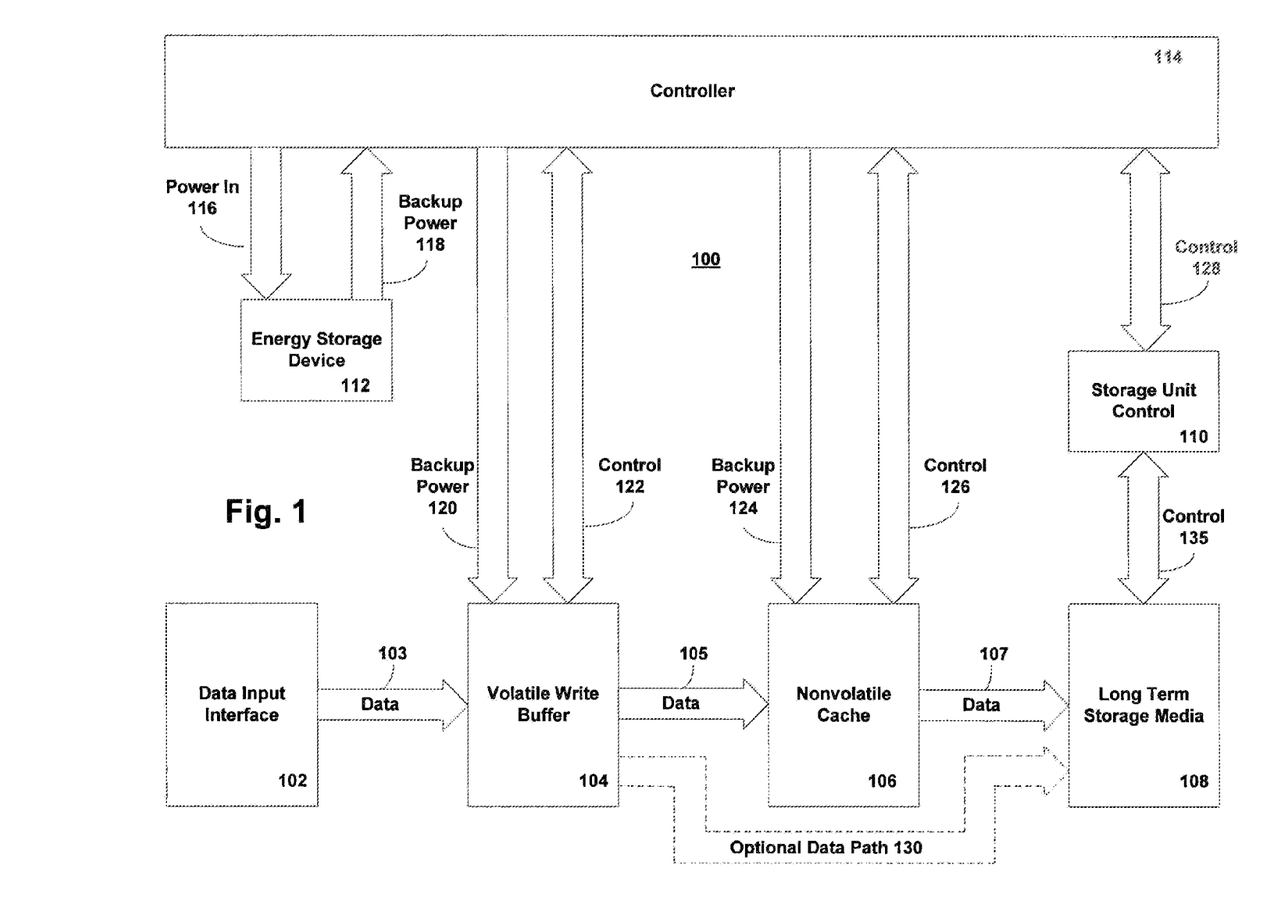
FIG. 1 is a block diagram of an exemplary system involving aspects of the invention.

FIG. 1 is a depiction of an exemplary system involving aspects of the invention. The system 100 is a data storage system for a computer (not shown) that has the advantage of no data loss upon removal of main power. For simplicity, it is assumed that all functional blocks of FIG. 1 are connected to main power. Main power is any conventional power source, such as line voltage, battery, power converter, or other power supply as is known in the art. Backup power to specific functional blocks in FIG. 1 is explicitly shown and will be described below.

The storage system 100 has a data interface 102 that may be a host computer bus such as an ATA, SCSI, PCI, or other type of data communication bus. The interface may be serial or parallel and presents data at its output 103. The write data 103 is written immediately into a write buffer 104 made of a relatively small amount of high speed, volatile, memory, such as a static random access memory (SRAM) or dynamic random access memory (DRAM). In the nonvolatile cache mode, the write data 105 stored in the write buffer 104 is then moved to a nonvolatile cache 106. The nonvolatile cache can be made of a larger amount of medium speed, solid state, nonvolatile memory, such as flash memory. One specific type of flash memory is NAND Flash memory.

The write data 107 of the nonvolatile memory 106 is eventually moved to the large capacity, long-term storage media 108, such as spinning magnetic media or optical media. The high speed volatile write buffer 104 allows the storage unit 108 to accept data from the data input interface 102 at maximum speed for short periods of time, independent of the speeds of non-volatile devices down stream. Under normal conditions, the controller 114 uses control lines 122, 126, 128 and 135 to orchestrate the above described movement of data from the data input interface 102 to the long term storage media 108. While under main power, the storage unit control 110, which may be associated with the long term storage media may be used to control the mechanisms inside the long term storage media 108.

In one embodiment, an optional write data path 130 may be used to connect the volatile write buffer 104 to the long term storage media 108 under normal conditions where the main power is supplied to the system 100. This option is referred to as the bypass mode.

In the nonvolatile mode, there are two data reliability issues with respect to the storage units. The first is that write data 105 must be moved to the nonvolatile cache 106 as soon as possible to avoid overrunning the write buffer 104 and slowing down the data rate on the data input interface 102. This write data queue issue may not exist if the system is operated in the bypass mode where write data from the volatile write buffer 104 is transferred directly to the long term storage media 108 under main power. However, there are periods of time that the data is in the volatile write buffer 104 is vulnerable to losses of main power. Upon loss of main power, the volatile write buffer 104 would be unable to complete its transfer of data to long term storage 108. The second issue is that the long-term storage media 108 may occasionally develop bad physical memory locations and this can lead to unreliable data storage if not handled carefully. This second issue is present in both modes of operation.

To guarantee that write data is never lost once accepted at the data input interface 102, two conditions are preferably met. The first is that write data stored to the nonvolatile cache 106 preferably reaches the long-term storage media 108 at the logical address written to by the host computer. The second is that write data stored in the volatile write buffer 104 preferably reaches the nonvolatile cache 106 if main power to the system 100 or just power to the storage unit 108 fails.

The first condition may be met as follows. Write data is normally provided with logical storage addresses. The write data and the associated logical address information is stored in the write buffer 104 in the bypass mode and in the nonvolatile cache 106 in the nonvolatile mode. The storage unit controller 110 firmware maintains a map of logical addresses to physical addresses. When the storage unit controller 110 moves data from the write buffer 104 in the bypass mode or from the nonvolatile cache 106 in the nonvolatile mode to the long-term storage media 108, it may discover that one or more memory cells at the physical address are bad. If bad cells are discovered, the storage unit controller 110 firmware must remap the logical storage address to a new physical address with good memory cells. In this way, write data reaches the long-term storage media 108 even if in the presence of bad memory cells in that media.

The second condition may be met as follows. To avoid loosing write data during a loss of main power to the system 100, memory space is preferably reserved in the nonvolatile cache 106 to hold the contents of the volatile write buffer 104. The size of the reserved memory space in nonvolatile cache 106 is preferably equal to or greater than the size of the volatile memory buffer. However, if main power is lost, no transfer of data is possible without backup power from some source. The controller 114 in FIG. 1 implements a circuit that detects if the main power is lost and if there is unsaved data in the volatile write buffer 104. Main power loss is detected by sensing the main power voltage present in the system 100. Unsaved write data in the write buffer 104 is detected using a volatile data present signal line coming from the volatile write buffer 104. This signal may be one of the control signals 122 from the write buffer.

If main power loss is detected by the controller 114 and there is unsaved data in the volatile write buffer, the controller 114 routes backup power 118 from the energy storage device 112 to the devices critical for moving data from the volatile write buffer 104 to the nonvolatile cache 106. These critical devices may include interface drivers and receivers as well as logic circuits for the volatile write buffer 104, the nonvolatile cache 106, and the controller 114. Backup power is preferentially not applied to other, non-critical devices during this data recovery state. For example, backup power is not necessary for the storage control unit 110 and long term storage media 108 as these units are not needed for the transfer of data from the write buffer 104 to the nonvolatile cache 106.

Logic for the controller 114 includes not only the power and data detection circuitry but also a state machine or its equivalent to perform the transfer. The state machine is triggered to start by a combination of a power loss signal and a data present signal from the write buffer. Once the data is moved from the volatile write buffer 104 to the nonvolatile cache 106, the volatile data present detection signal is de-asserted and the backup power may be removed from the devices.

In one embodiment, the controller 114 ensures that devices at the interface between un-powered and backup powered circuitry sections have controlled inputs so as to avoid the problem of unspecified device loading characteristics when an un-powered device is connected to a powered device. This can be performed with any of the well known techniques such as using high impedance outputs, pull up resistors to backup power on floating inputs, and special interface isolation devices.

In one embodiment, the controller 114 can embody the storage unit control 110. In another embodiment, the controller 114 can be broken into multiple sub-units. For example, the controller can be split up into a power controller and a data controller. Such options are well known in the art. The use of state machines for logical control is also well known and may be applied as an integrated controller unit, such as an ASIC or programmable controller, or as multiple sub-units composed of one or more state machines. In an alternate embodiment, the controller 114 could put all non-essential devices into a low power state upon detection of a power loss signal if such a state is supported by the devices and the low power state does not compromise the ability to recover the data.

The energy storage device 112 may be a large capacitor or a small battery depending on the power requirements of the devices of the system 100 that need backup power to move data from the volatile write buffer 104 to the nonvolatile cache 106. The energy storage device must nominally supply enough stored energy to complete the data recovery process. The amount of stored energy depends on the amount of circuitry to be supplied backup power and the length of time to complete the data transfer from the write buffer to the nonvolatile cache. These parameters are implementation dependent and may vary considerably if, for example one implementation uses discrete components while another uses highly integrated, low power devices. Example benchmarks for sizing include a write buffer using a 1 MB DRAM, a nonvolatile cache of 32 MB of NAND flash, a digital controller implemented using an ASIC device and a write transfer time of approximately 200 microseconds per 4 KB block. Under these backup power constraints, the energy storage device need not be large because all the data can be transferred in short amount of time (50 msec) so that a small battery or large capacitor may suffice.

After the controller or state machine, using backup power, performs the write data transfer from the write buffer 104 to the nonvolatile cache 106, then the system can remove backup power and can lie dormant until the restoration of main power. Upon the restoration of main power, the nonvolatile cache 106 can signal the controller 114 or equivalent state machine that there is write data present. The controller 114 can then activate the nonvolatile cache 106 along with the storage unit control 110 to transfer the write data to the long term storage media 108. The controller 114 can also respond to new write data being presented to the data input interface 102. The energy storage device can be re-charged and prepared for the next main power loss.

In one embodiment, the long term storage media can be power cycled to save power. Disk drive systems are known to consume large amounts of power and power cycling is one technique to reduce power consumption between active disk accesses. In such an environment, the nonvolatile mode of the invention would be used where data flows from the data input interface 102 to the write buffer 104 to the nonvolatile cache 106 to the long term storage media 108. The optional data path 130 may or may not be used in such a configuration. The nonvolatile cache 106 is needed to store data not being transferred into long term storage 108 while that storage was being powered down. It is estimated that for reasonable power savings, a disk storage version of the long term storage would have to be powered down for at least 0.5 minutes. This parameter, and the write transfer into the nonvolatile cache can be used to estimate the size of the nonvolatile cache needed. In this power cycled disk embodiment, the energy storage device would still only need to be sized to accommodate a transfer of write data from the smaller write buffer to the nonvolatile cache because during a power cycle, only the disk drive would be powered down and not the other data transfer circuitry. The energy storage device need only be used during a main power loss and not during a power cycling event.

Figure 2:
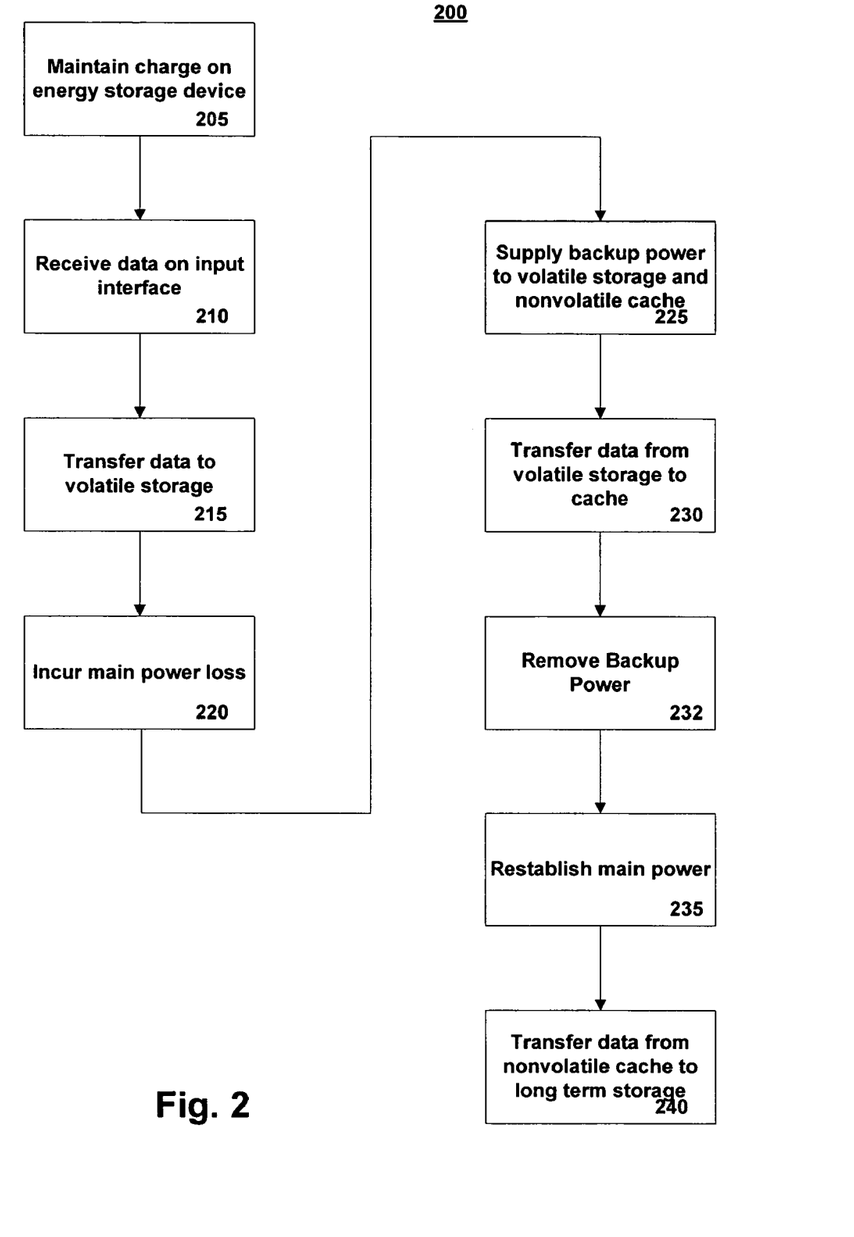
FIG. 2 is a exemplary flow diagram of an embodiment of the invention.

FIG. 2 is a flow diagram of a general flow 200 of the process involving data recovery according to aspects of the invention. The process presumes that a charge be stored on the energy storage device used for backup power (step 205). Write data is received in the input data interface (step 210) the input data interface being the output data from a data source such as a host computer. The write data is transferred to volatile storage (step 215) or write data buffer. The volatile storage is normally used to accommodate variations in write data volume and speed arriving from the write data interface. Under normal, non-main power loss conditions, the write data would be transferred to the ultimate destination; the long term storage of disk storage. However, the process 200 specifically deals with the condition of a main power loss. Consequently, under the condition where there is data detected in the volatile storage or write data buffer, a main power loss is experienced (step 220).

At this time, as the main power is going down, the backup power from the energy storage device is being applied to the volatile storage and nonvolatile cache (step 225). This action may be conditioned on the detection of write data in volatile memory. This action allows the write data in the volatile storage to be preserved. Next, the detected write data is transferred from the volatile storage or write buffer to the nonvolatile cache (step 230). This action preserves the write data in the nonvolatile cache such that if the backup power is lost or removed, the write data is not lost. At this time, the backup power may be fully dissipated or it may optionally be removed (Step 232). In either event, the write data lies dormant but preserved in the cache. Main power is restored in step 235. Upon the restoration of main power, the process 200 continues by transferring the preserved write data stored in the nonvolatile cache into it's final destination; the long term storage (step 240). The occurrence of other activities, such as the initiation of additional write data in step 210 on the input to the process 200 during the transfer of step 240, do not affect the core process steps reflected in FIG. 2.

In another embodiment, the core steps of process 200 may be modified somewhat and repeated in a system which utilizes a long term storage device, such as a disk drive, which may be power cycled to save system power. In that environment, the process 300 of FIG. 3 may apply. The process 300 is a continuous one wherein it is assumed that no unintentional power failure is experienced, but, aspects of the current invention may be utilized to advantage. In the process, write data input to a system is being transferred from an input to the long term storage destination (step 310). Somewhere in this continuous transfer, the long term storage device, such as a magnetic or optical disk, is intentionally powered down to save power (step 315). Although data may still be incoming, all write data that is received is transferred from volatile storage (write buffer) to nonvolatile cache (step 325). Here the data lies safely stored until disk power is purposely restored (step 330). Upon restoration of power, the long term storage device is reactivated to full service. Then, the preserved write data is transferred from nonvolatile cache to the long term storage device (step 335). Additional data may then be flowed through the system as before (step 310) until the next intentional power cycling of the disk drive at step 310. Thus the process may repeat allowing the disk drive to be power cycled while data is being preserved for eventual long term storage.

Figure 3:
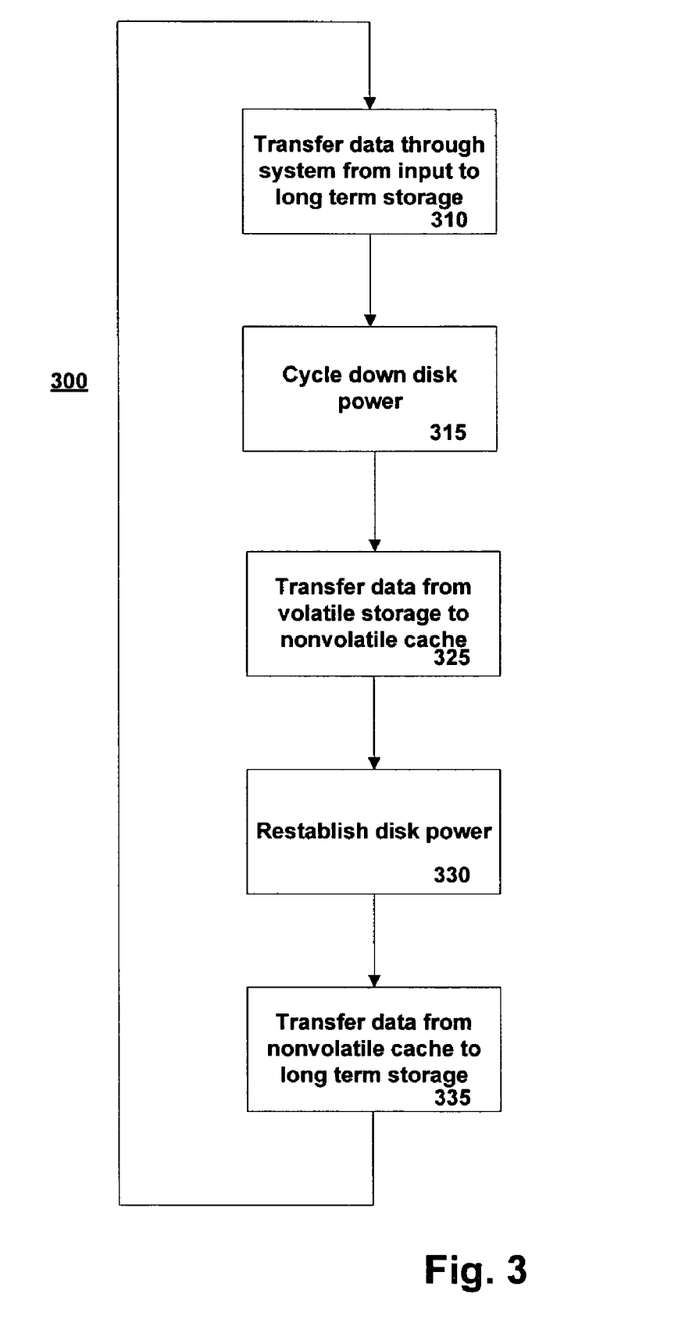
FIG. 3 is another exemplary flow diagram of an embodiment of the invention.

In one embodiment of the invention, the process of FIG. 2 and the process of FIG. 3 are both used. The embodiment is a system where the long term storage device is intentionally power cycled to save overall system power. Additionally, an energy storage device is used such that inadvertent main power losses do not result in the loss of write data as in the flow of FIG. 2 and the configuration of FIG. 1. In this embodiment, a discrimination between an inadvertent power loss and a purposeful power cycling event may be necessary. This is accomplished by discriminating between main power loss and long term storage device power cycling as the two events are distinct and can be detected separately as is well known in the art.

In one embodiment, the controller 114 or aspects thereof are under the control of a processor, preferably a low power processor, whose instructions include performing the control functions of the methods indicated in FIGS. 2 and 3. The instructions can be available as Read only memory, random access memory, or other solid state memory form. Such instructions may be programmable in that the instructions may be downloadable from a host computer-readable medium, such as a floppy disk, to the controller 114 of FIG. 1.

Exemplary Computing Device

Figure 4:
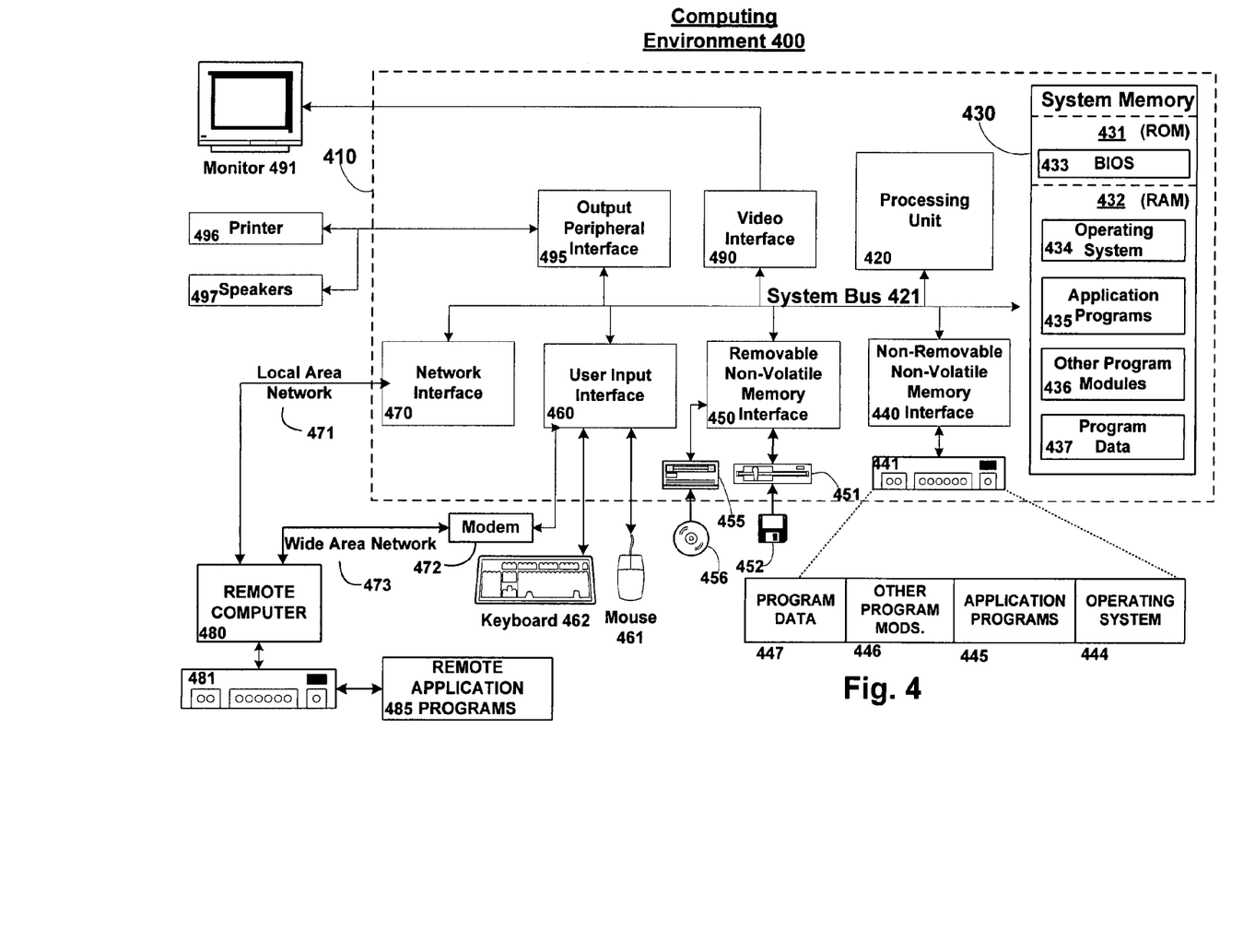
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. Aspects of the invention may be implemented in block 441 of FIG. 4. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CD ROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a scheme to prevent data loss upon interruption of power to a long term storage device. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of preventing data loss during a voluntary disk drive power loss event and an involuntary primary power loss event, the method comprising:

supplying write data from a host computer into a volatile write buffer;

transferring the write data directly from the volatile write buffer to a disk drive while disk drive power is present;

maintaining charge in an energy storage device;

supplying electrical power from the energy storage device upon detection of the involuntary primary power loss event, wherein the electrical power is supplied to at least the volatile write buffer and nonvolatile cache to save the write data to the non-volatile cache in an occurrence of the involuntary primary power loss event;

otherwise, moving the write data from volatile buffer into the nonvolatile cache during the voluntary disk drive power loss event while continuing to accept incoming data to the volatile buffer from the host computer;

transferring the write data from the nonvolatile cache to the disk drive upon cessation of the voluntary disk drive power loss event, whereby loss of the write data is prevented while the disk drive is temporarily powered down; and wherein data flowing from the volatile write buffer directly into the disk drive bypasses the non-volatile cache while disk drive power is present.

2. The method of claim 1, wherein supplying write data into a write buffer comprises supplying data from a host processor interface.

3. The method of claim 1, wherein maintaining charge in an energy storage device comprises maintaining an electrical charge in one or more of a battery and a capacitor, wherein the energy storage device is charged while primary power is available.

4. The method of claim 1, wherein supplying the electrical power from the energy storage device upon detection of a primary power loss event comprises circuitry to simultaneously apply the electrical power from the energy storage device while the primary power is falling below a threshold level.

5. The method of claim 1, wherein supplying the electrical power further comprises supplying power to a state machine that acts to move the write data from the write buffer to the nonvolatile cache.

6. The method of claim 1, wherein supplying electrical power from the energy storage device upon detection of a primary power loss event further comprises detecting write data in at least one of the volatile buffer and the nonvolatile cache.

7. The method of claim 1, wherein moving the write data from volatile buffer into the nonvolatile cache during the primary power loss event further comprises detecting write data in the volatile buffer before the move.

8. The method of claim 1, wherein transferring the write data from the nonvolatile cache to long term storage media upon cessation of the primary power loss event further comprises detecting write data in the nonvolatile cache before transferring the write data.

9. The method of claim 1, further comprising reserving enough memory space in the nonvolatile cache to hold the write data.

10. The method of claim 1, wherein moving the write data comprises moving write buffer data and associated addresses into nonvolatile cache.

11. The method of claim 1, wherein transferring the write data comprises transferring the write data into physical address locations in long term storage after the primary power is restored.

12. The method of claim 1, wherein supplying electrical power from the energy storage device upon detection of a primary power loss event further comprises supplying the electrical power wherein the primary power loss event is one of a planned shutdown to save overall system power and an unplanned primary power failure.

13. A system for saving data during a power loss, the system comprising:

a write data interface that supplies write data from a host computer to be written into long term storage media;

a volatile write buffer for accepting the write data from the data interface;

a nonvolatile cache to store the write data at least during a power loss;

an energy storage device for delivering backup power during an involuntary loss of a primary power source; and a controller for controlling the flow of the write data during normal powered operations, during a loss of primary power, and during a voluntary power loss of the disk drive, wherein:

during the normal powered operations, data from the volatile write buffer flows directly into the long term storage media and bypasses the non-volatile cache while primary power is present;

during the voluntary power loss of the disk drive, the controller configures the system to store constantly incoming write data from the host computer into the volatile write buffer and transfers the stored constantly incoming write data from the volatile write buffer to the nonvolatile cache; and during the involuntary loss of primary power, the controller routes backup power to at least the volatile write buffer and nonvolatile cache and transfers the write data such that any write data residing in the volatile write buffer upon primary power loss is moved to the nonvolatile cache.

14. The system of claim 13, wherein the write data interface comprises at least one of a host bus interface and an input/output (I/O) interface that supplies data to be written into long term storage media.

15. The system of claim 13, wherein the volatile write buffer comprises high speed volatile solid state memory.

16. The system of claim 13, wherein a nonvolatile cache comprises nonvolatile solid state storage having a capacity to store at least the contents of the volatile write buffer.

17. The system of claim 13, wherein the energy storage device is at least one of a battery and a capacitor that can deliver backup power long enough to transfer the write data from the volatile write buffer to the nonvolatile cache after loss of primary power.

18. The system of claim 13, wherein the controller comprises a state machine for conducting the transfer of write data to the nonvolatile cache after primary power loss and for conducting the transfer of the write data to the long term storage after primary power is restored.

19. A method of preventing data loss, the method comprising:

supplying write data from a host computer into a write buffer;

transferring the write data in the write buffer directly into a target disk storage device and bypassing non-volatile cache while power is supplied to the target disk storage device;

moving the write data into the nonvolatile cache upon detection that the target disk storage device has been power cycled off, wherein the host computer continues to supply write data while the target storage device has been powered off; and transferring the write data from the nonvolatile cache to the target disk storage device upon detection that the target disk storage device has been power cycled on whereby loss of the write data is prevented during a power cycle event.

20. The method of claim 19, further comprising:

maintaining charge in an energy storage device;

supplying electrical power from the energy storage device upon detection of a primary power loss event, wherein the electrical power is supplied to at least the write buffer and the nonvolatile cache; and moving the write data into the nonvolatile cache during the primary power loss event.

21. A system for protecting data, the system comprising:

a write data interface connected to a host computer that supplies write data to be written to a disk storage device;

a volatile write buffer for accepting the write data from the data interface;

a nonvolatile cache to store the write data at least during a power cycling off event of the disk storage device, wherein the host computer continues to supply write data during the power cycling off event of the disk storage device, and wherein the nonvolatile cache is bypassed by flowing the write data directly from the volatile buffer to the disk storage device when power is supplied to the disk storage device; and means for:

detecting at least one of a power cycling off event and presence of write data in the volatile write buffer;

transferring the write data from the volatile write buffer to the nonvolatile cache; and detecting a power cycling on event and transferring the write data in the nonvolatile cache to the disk storage device.

22. The system of claim 21, further comprising:

an energy storage device for delivering backup power during a loss of a primary power source; wherein the controller routes backup power to at least the volatile write buffer and nonvolatile cache and transfers write data from the write buffer to the nonvolatile cache after detection of the loss of a primary power source.

23. The system of claim 21, wherein the means for at least one of detecting power cycling off event, detecting presence of write data in the volatile write buffer, transferring the write data, and detecting a power cycling on event comprises at least one of an integrated controller and a state machine.

* * * * *